(12) United States Patent
Philipp et al.

(10) Patent No.: US 11,843,845 B2
(45) Date of Patent: Dec. 12, 2023

(54) PROTECTIVE LENS COVER FOR A CAMERA

(71) Applicant: GM GLOBAL TECHNOLOGY OPERATIONS LLC, Detroit, MI (US)

(72) Inventors: Tzvi Philipp, Bet Shemesh (IL); Timothy Busch, Bloomfield Hills, MI (US)

(73) Assignee: GM Global Technology Operations LLC, Detroit, MI (US)

(*) Notice: Subject to any disclaimer, the term of this patent is extended or adjusted under 35 U.S.C. 154(b) by 101 days.

(21) Appl. No.: 17/569,934

(22) Filed: Jan. 6, 2022

(65) Prior Publication Data
US 2023/0217089 A1    Jul. 6, 2023

(51) Int. Cl.
| | |
|---|---|
| *H04N 23/51* | (2023.01) |
| *B60R 11/04* | (2006.01) |
| *G02B 6/26* | (2006.01) |
| *G03B 17/02* | (2021.01) |
| *B60R 11/00* | (2006.01) |

(52) U.S. Cl.
CPC ............ *H04N 23/51* (2023.01); *B60R 11/04* (2013.01); *G02B 6/262* (2013.01); *G03B 17/02* (2013.01); *B60R 2011/004* (2013.01)

(58) Field of Classification Search
CPC ... H04N 23/51; B60R 11/04; B60R 2011/004; G02B 6/262; G03B 17/02
See application file for complete search history.

(56) References Cited

U.S. PATENT DOCUMENTS

| | | | | |
|---|---|---|---|---|
| 2003/0214733 A1* | 11/2003 | Fujikawa | ............... | B60R 1/00 |
| | | | | 359/838 |
| 2019/0377072 A1* | 12/2019 | Astrom | ............ | G02B 27/0006 |
| 2023/0075148 A1* | 3/2023 | Liang | .................. | H04N 23/57 |

FOREIGN PATENT DOCUMENTS

| | | | | |
|---|---|---|---|---|
| CN | 102317859 B | * | 7/2013 | ............ G03B 11/00 |
| CN | 107660266 A | * | 2/2018 | ............ G01B 11/12 |
| JP | 2004077123 A | * | 3/2004 | ............ G01B 11/00 |
| JP | 2004233460 A | * | 8/2004 | |
| JP | 2008172532 A | * | 7/2008 | |
| JP | 2010055023 A | * | 3/2010 | |

* cited by examiner

*Primary Examiner* — Michael Lee
(74) *Attorney, Agent, or Firm* — Quinn IP Law

(57) ABSTRACT

A protective cover for a camera includes a housing configured for attachment to one of the camera and a support structure which supports the camera, a lens attached to the housing and configured for alignment with an imaging axis of the camera, a light source attached to the housing and configured for providing light to a field of view of the camera, and an electrical connector carried by the housing and configured for receiving power and/or signal commands and for conveying the power and/or signal commands to the light source. The lens may be a meniscus-shaped macro lens, and a lightguide may be attached to or incorporated into at least one of the housing and the light source. The protective cover may be used to protect a camera mounted in a wheel well or anywhere along an outer surface of an automotive vehicle.

14 Claims, 3 Drawing Sheets

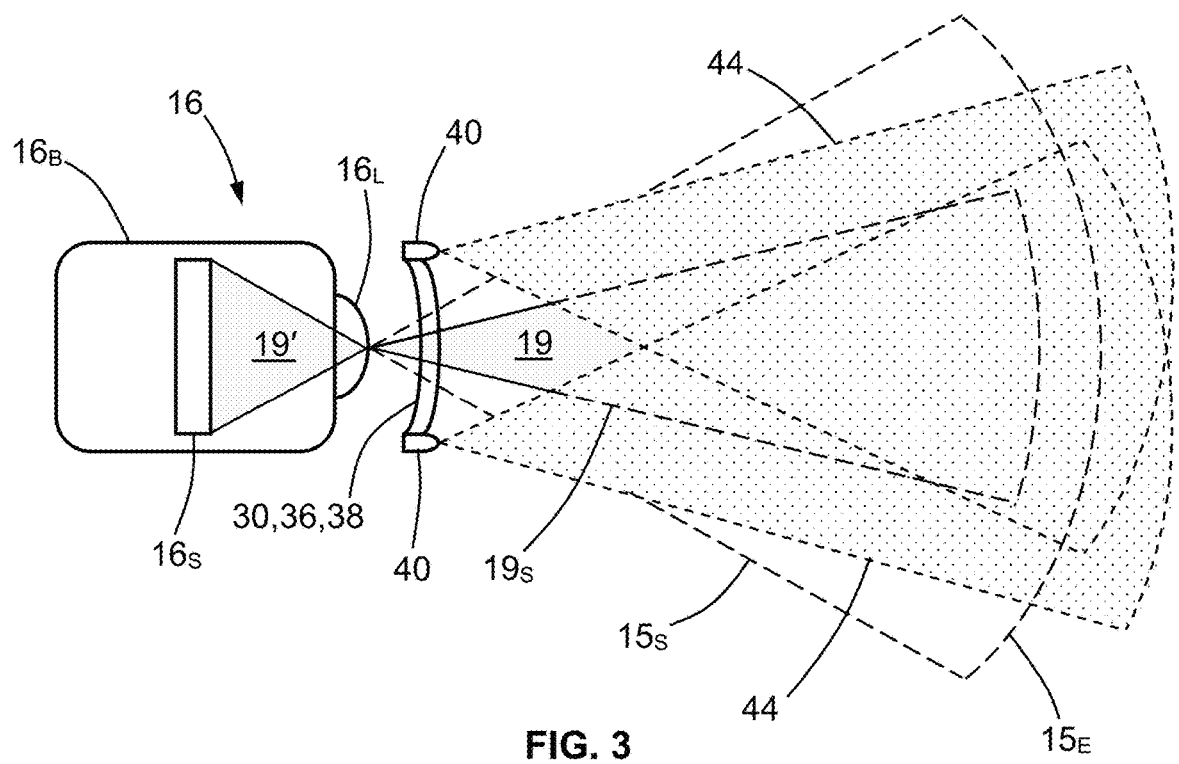
FIG. 3
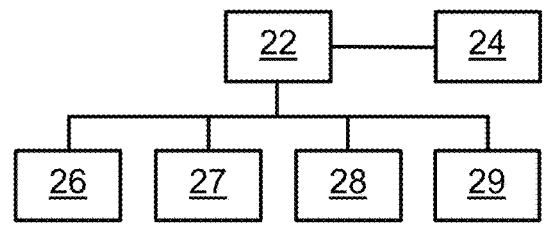
FIG. 4
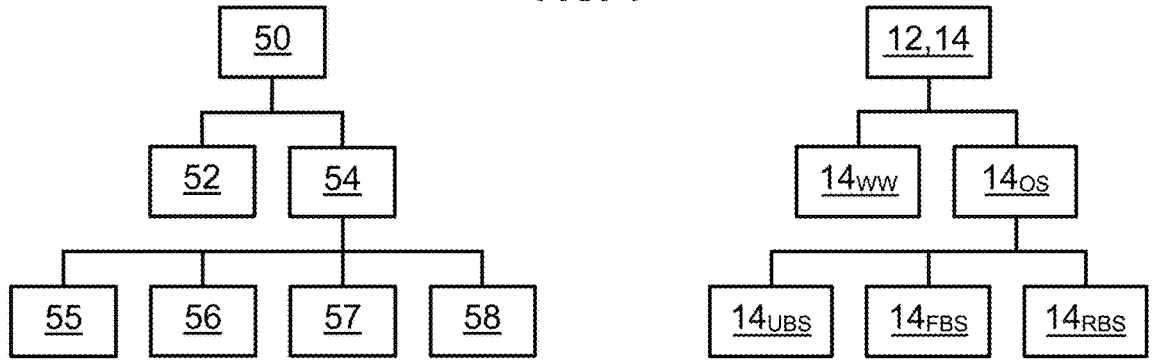
FIG. 5   FIG. 6

PROTECTIVE LENS COVER FOR A CAMERA

INTRODUCTION

This disclosure relates generally to protective lens covers for cameras, and more particularly to illuminated macro lens covers for protecting vehicle-mountable cameras.

Automotive vehicles may use cameras attached to the outside of the vehicle body, with each camera connected to a display screen inside the vehicle to show each camera's view to the driver. For example, a camera may be mounted to the rear of the vehicle to assist with backing up and parking, or in one or more of the wheel wells to show how the wheel and axle are traversing over large rocks or rough terrain to assist in off-road situations.

However, since the cameras are mounted on the exterior of the vehicle, their views may become obscured or diminished due to the presence or build-up of rain, snow, dirt, mud and the like, as well as due to low-light situations or conditions.

SUMMARY

According to one embodiment, a protective cover for a camera includes a housing configured for attachment to one of the camera and a support structure which supports the camera, a lens attached to the housing and configured for alignment with an imaging axis of the camera, a light source attached to the housing and configured for providing light to a field of view of the camera, and an electrical connector carried by the housing and configured for receiving power and/or signal commands and for conveying the power and/or signal commands to the light source.

The protective cover may also include a lightguide attached to or incorporated into at least one of the housing and the light source and configured for conveying light from the light source to the field of view of the camera. The lightguide may be configured to emit the light from the light source from one or more exit points located at or outside of an outer periphery of the lens. Additionally or alternatively, the protective cover may further include one or more light isolating features attached to or incorporated into at least one of the housing, the lens and the lightguide, where the light isolating features are configured to minimize or prevent the light from the light source from being directed or reflected into an imaging path of the camera.

The signal commands may include one or more of an ON command, an OFF command, a light source selection command or identifier, and a lighting sequence command. The light source may include one or more light-emitting diodes, the housing may be made of a polymer material, and the housing may include one or more of a snap-on feature, a mounting boss, a mounting hole and a captive fastener. The lens may be a meniscus-shaped macro lens and may be coated with a hydrophobic coating.

According to another embodiment, an illuminated macro lens cover for a vehicle-mountable camera includes: a housing made of a polymer material and configured for attachment to one of the camera and a support structure which supports the camera; a meniscus-shaped macro lens attached to the housing and configured for alignment with an imaging axis of the camera; a light source attached to the housing and configured for providing light to a field of view of the camera; a lightguide attached to or incorporated into at least one of the housing and the light source and configured for conveying light from the light source to the field of view of the camera from one or more exit points located at or outside of an outer periphery of the lens; and an electrical connector carried by the housing and configured for receiving power and/or signal commands and for conveying the power and/or signal commands to the light source.

The illuminated macro lens cover may further include one or more light isolating features attached to or incorporated into at least one of the housing, the lens and the lightguide and configured to minimize or prevent the light from the light source from being directed or reflected into an imaging path of the camera. The signal commands may include one or more of an ON command, an OFF command, a light source selection command or identifier, and a lighting sequence command. The light source may include one or more light-emitting diodes, the lens may be coated with a hydrophobic coating, and the housing may include one or more of a snap-on feature, a mounting boss, a mounting hole and a captive fastener.

According to yet another embodiment, a vehicle camera system includes a vehicle body structure, a camera attached to the vehicle body structure, and a protective cover for the camera. The protective cover includes a housing configured for attachment to one of the camera and the vehicle body structure, a lens attached to the housing and configured for alignment with an imaging axis of the camera, a light source attached to the housing and configured for providing light to a field of view of the camera, and an electrical connector carried by the housing and configured for receiving power and/or signal commands and for conveying the power and/or signal commands to the light source.

The vehicle body structure may be a wheel well, an underbody structure, a rear body structure or a front body structure. The vehicle camera system may further include a lightguide attached to or incorporated into at least one of the housing and the light source and configured for conveying light from the light source to the field of view of the camera. The vehicle camera system may also further include one or more light isolating features attached to or incorporated into at least one of the housing, the lens and the lightguide and configured to minimize or prevent the light from the light source from being directed or reflected into an imaging path of the camera.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

FIG. 3 is a schematic view of a camera and a macro lens with a lighting source located at a periphery of the macro lens.

FIG. 4 is a block diagram of a housing for a protective cover for a camera, showing various aspects of the housing.

FIG. 5 is a block diagram of an electrical connector for a protective cover for a camera, showing various aspects of the electrical connector.

FIG. 6 is a block diagram of a support structure for a protective cover for a camera, showing various aspects of the support structure.

DETAILED DESCRIPTION

Figure 1:
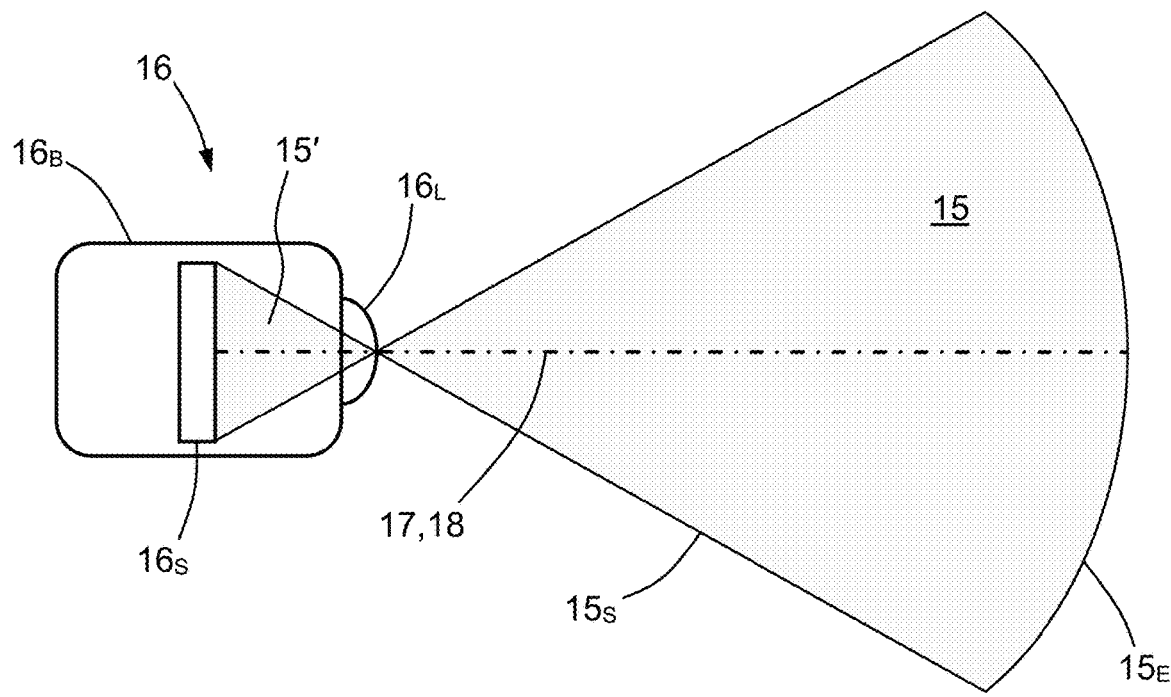
FIG. 1 is a schematic view of a camera and its field of view.

Referring now to the drawings, wherein like numerals indicate like parts in the several views, a protective cover 20 for a camera 16, such as an illuminated macro lens cover 20 for a vehicle-mountable camera 16, and a vehicle camera system 10, are shown and described herein.

The protective cover 20 may be used to protect a camera 16 that is mounted in a wheel well 14$ww$ of an automotive vehicle 12 or anywhere along an outer surface 14$os$ of the vehicle 12. When the protective cover 20 is mounted in operative relation with a camera 16, it helps protect the camera 16 from external elements like rain, snow, dirt, mud, flying debris and the like, and may help improve the view of the camera 16 by adding illumination to the camera's field of view 19.

FIG. 1 shows a schematic view of a camera 16 and its main field of view 15, without any protective cover 20. The camera 16 includes a camera body 16$_B$ containing an imaging sensor 16$_S$, and a camera lens 16$_L$ which receives light from the main field of view 15 and focuses it onto the imaging sensor 16$_S$. Note that the camera lens 16$_L$ produces a refracted field of view 15' which is inverted from the main field of view 15. The camera 16 has an imaging axis 17 which typically extends in a straight line from the center of the imaging sensor 16$_S$ to the center of the camera lens 16$_L$, and which further extends forward into the main field of view 15. The camera 16 also has an imaging path 18 which is defined by the path between an object in the main field of view 15 and the image of that object as it impinges on the imaging sensor 16$_S$. For the simple single-lens camera 16 shown in FIG. 1, the imaging path 18 is the same as the imaging axis 17; however, in other cases where the camera 16 includes two or more optical elements (i.e., lenses and/or mirrors), the imaging path 18 may be different from the imaging axis 17.

The field of view 15 of the camera 16 shown in FIG. 1 has a generally conical side 15$_S$ and a far end 15$_E$ which generally has the shape of a spherical cap. It should be appreciated that while the generally conical side 15$_S$ and generally spherical end 15$_E$ of the main field of view 15 are shown as being sharply defined, they may also be diffuse and not so sharply defined, such as on a gradient.

Figure 2:
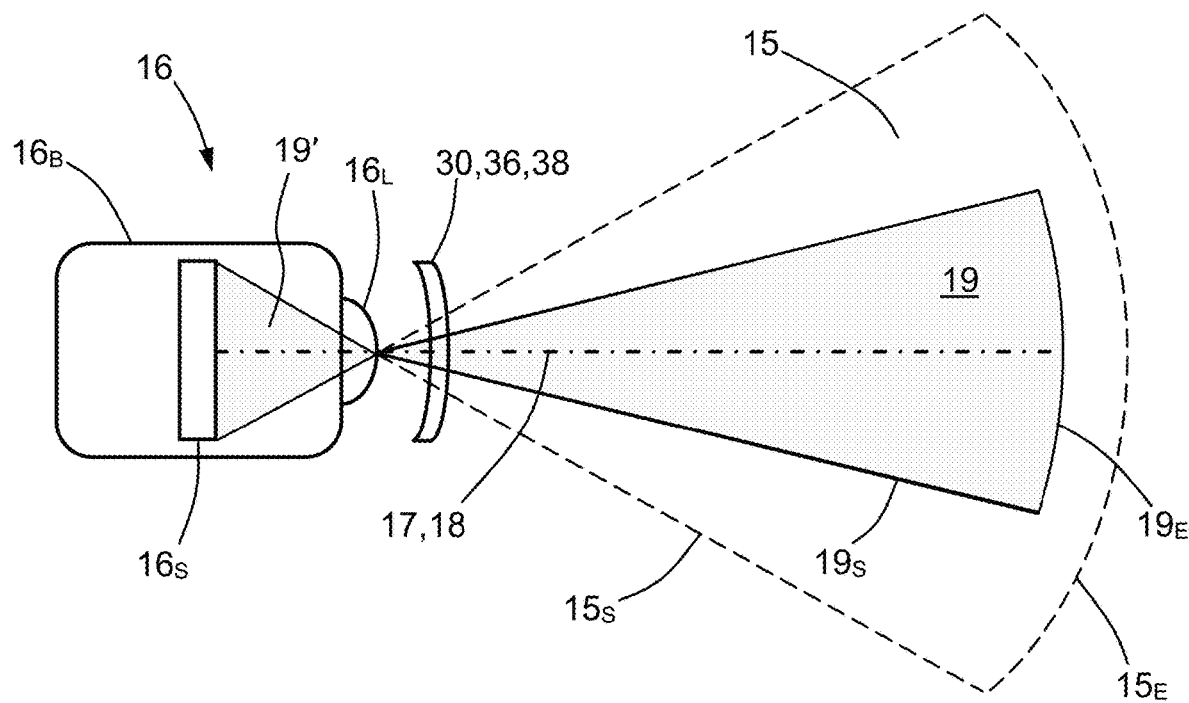
FIG. 2 is a schematic view of a camera and a macro lens having a reduced field of view.

In contrast, FIG. 2 shows the same camera 16 of FIG. 1, but with another lens 30—specifically, a macro lens 38 having a meniscus-like shape 36—disposed in front of the camera lens 16$_L$. The macro lens 38 is centered with respect to and aligned along the imaging axis 17 and the imaging path 18, which produces a reduced field of view 19 as compared to the main field of view 15 of FIG. 1. This "reduced" field of view 19 subsumes a smaller overall volume than does the main field of view 15. Specifically, the reduced field of view 19 has a generally cone-shaped side 19$_S$ which is smaller in breadth than is the generally cone-shaped side 15$_S$ of the main field of view 15, and a far end 19$_E$ which is shorter in distance from the camera lens 16$_L$ than is the far end 15$_E$ of the main field of view 15. Also note that a refracted field of view 19' is produced, which is inverted from the reduced field of view 19.

FIG. 3 shows a schematic view of the same camera 16 and macro lens 38 of FIG. 2, but with two lighting sources 40 located about a periphery 34 of the macro lens 38. Here, each of the light sources 40 produces a respective stream of light 44 which illuminates a large portion of the reduced field of view 19 that is distal or "downfield" from the macro lens 38 (but does not illuminate the smaller portion of the reduced field of view 19 that is more "upfield" and nearer to the macro lens 38). As illustrated, the streams of light 44 produced by the light sources 40 may overlap each other in the distal or downfield portion of the reduced field of view 19.

Figure 7:
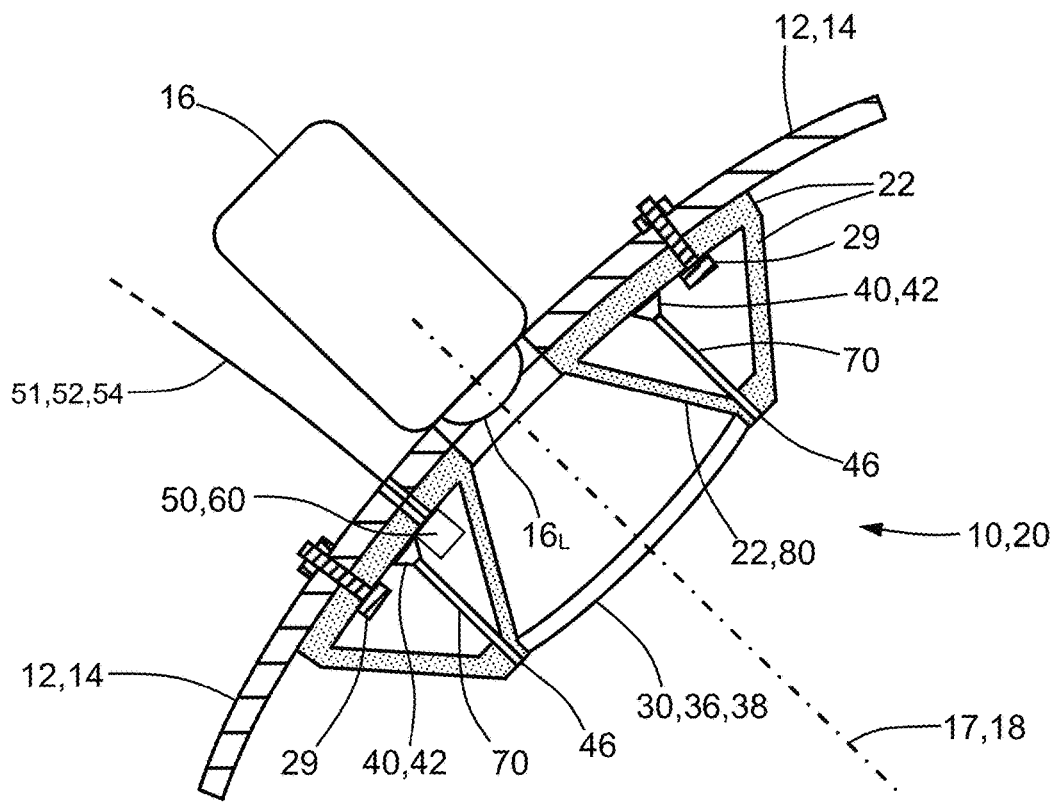
FIG. 7 is a schematic cross-sectional view of a protective cover for a camera, where the protective cover and camera are attached to a support structure.

Turning now to FIGS. 4-8, a protective cover 20 for a camera 16 is shown, along with various aspects and features of the protective cover 20 and its components. In particular, FIG. 7 shows a schematic cross-sectional view of the protective cover 20, where the protective cover 20 and camera 16 are attached to a support structure 14. According to one embodiment, the protective cover 20 includes a housing 22 configured for attachment to either the camera 16, the support structure 14, or both the camera 16 and the support structure 14. A lens 30 is attached to or carried by the housing 22, and is configured for alignment with an imaging axis 17 of the camera 16. The lens 30 may be a macro lens 38 having a meniscus-like shape 36, and may be coated with a hydrophobic coating 39 to help repel water and mud. A light source 40, such as one or more light-emitting diodes (LEDs) 42, is attached to the housing 22 and is configured for providing light 44 to at last some of the field of view 19 of the camera 16. An electrical connector 50 is attached to or is carried by the housing 22, and is configured for receiving power 52 and/or signal commands 54 and for conveying the power 52 and/or signal commands 54 to the light source 40.

As indicated by the block diagram of FIG. 4, the housing 22 may be made of a polymer material 24 and may include one or more of a snap-on feature 26, a mounting boss 27, a mounting hole 28 and a captive fastener 29 to facilitate attachment of the housing 22 to at least one of the camera 16 and the support structure 14. For example, the protective cover 20 shown in FIG. 7 includes two captive fasteners 29, such as captive bolts. As illustrated, the housing 22 may be positioned against the support structure 14 such that the captive bolts 29 extend through corresponding holes formed in the support structure 14, so that nuts may be threaded onto the bolts 29 from the back side of the structure 14, thus fastening the protective cover 20 and support structure 14 together. As shown in FIG. 7, the camera 16 may be supported by and/or attached to the support structure 14, with the camera lens 16$_L$ aligned with holes or gaps formed in the support structure 14 and the housing 22, thus permitting an unobstructed line-of-sight between the camera lens 16$_L$ and the macro lens 38.

As shown by the block diagram of FIG. 5, the electrical connector 50 may be configured to receive power 52 and/or signal commands 54 from an external source. For example, power 52 may be supplied by a power bus or from an electrical module, such as an engine control module (ECM), a body control module (BCM) or a general electronic module (GEM), and the signal commands 54 may be provided by one of these modules. The power 52 and command signals 54 may be received along a wire 51 which is connected to the electrical connector 50 and which extends through small holes or gaps in the support structure 14 and/or the housing 22. The signal commands 54 may include one or more of an "ON" command 55 (to turn one or more light sources 40 on), an "OFF" command 56 (to turn one or more light sources 40 off), a light source selection command or identifier 57 (to select or identify particular ones of the light sources 40, such as in preparation for an upcoming ON or OFF command 55, 56), a lighting sequence command 58 (to identify or load a predetermined sequence and timing pattern of particular light sources 40 being turned on or turned off), and any other appropriate signal for controlling or actuating one or more of the light sources 40 (such as a brightness or intensity level). A processor 60 may be included in or associated with the electrical connector 50 for one or more of receiving, processing and sending signals for turning individual light sources 40 on and off. Thus, with the electrical connector 50 (and optional processor 60) receiving power 52 and command signals 54, the light sources 40 may be turned on and off individually or in groups, and also may be turned on/off in different patterns and at various speeds, as commanded.

Figure 8:
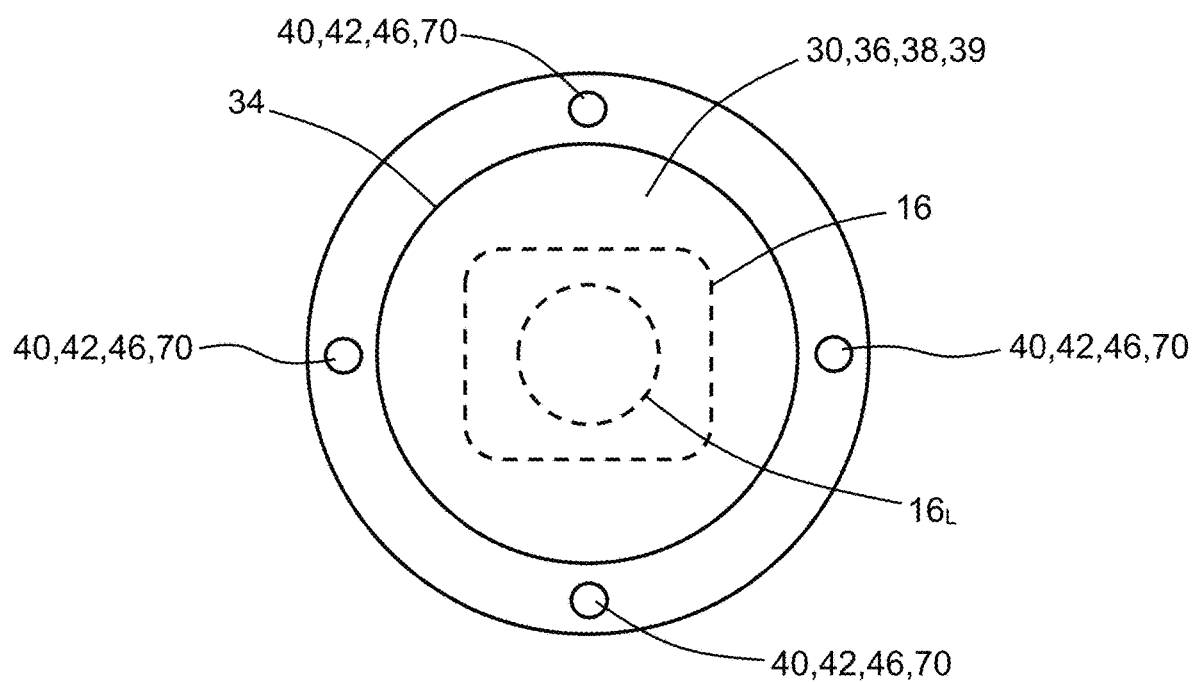
FIG. 8 is a schematic front view of a portion of the protective cover showing the camera, lens and light sources.

As shown in FIG. 7, the protective cover 20 may also include a lightguide 70 that is attached to or incorporated into at least one of the housing 22 and the light source 40, and is configured for conveying light 44 from the light source 40 to the main field of view 19 of the camera 16. For example, the lightguide 70 may be a fiber optic element, or it may be a portion of the molded plastic housing 22 that is suitably sized, shaped and positioned to serve as a light conduit or light pipe. The lightguide 70 may be configured to receive light 44 from the light source 40 and emit it from one or more exit points 46 located at or outside of an outer periphery or perimeter 34 of the lens 30, 38. (These exit points 46 may be the ends of the lightguides 70, such as the tips of light pipes.) As illustrated in FIG. 8, four equally spaced light sources 40, LEDs 42 or lightguides 70 (i.e., exit points 46 of the lightguides 70) may be positioned around the macro lens 38, just outside of the outer periphery or perimeter 34 of the lens 38.

As further shown in FIG. 7, the protective cover 20 may also include or one or more light isolating features 80 that are attached to or incorporated into the housing 22, the lens 30 and/or the lightguide 70. These light isolating features 80 are configured to minimize or prevent light 44 from the light source 40 from being directed or reflected into the imaging path 18 of the camera 16 (so as to minimize or eliminate glare, washout, etc.). For example, a light isolating feature 80 may include a wall portion of the housing 22 that is sized, shaped and located so as to block light 44 from the light source 40 from egressing into the imaging path 18. Such wall portions may be painted, coated or otherwise occluded to prevent light 44 from passing therethrough.

As illustrated by the block diagram of FIG. 6, the support structure 14 may be a wheel well 14$ww$ or an outer surface 14$os$ of a vehicle 12. For example, the outer surface 14$os$ may be an underbody structure 14$_{UBS}$ (e.g., a skid plate), a front body structure 14$_{FBS}$ (e.g., a front grill or a front bumper), or a rear body structure 14$_{RBS}$ (e.g., a tailgate or a trunk). The front and rear body structures 14$_{RBS}$, 14$_{RBS}$ may include those portions of the vehicle body which house the headlights, tail lights and turn signal lights, as well as those portions which house or support back-up sensors, pedestrian sensors, curb sensors and the like. Accordingly, the protective cover 20 of the present disclosure may be used in any of these vehicle locations to protect a camera 16 that is mounted thereat.

When the protective cover 20 with a meniscus-shaped/ macro lens 36, 38 is utilized with a camera 16, such as in the vehicular applications described herein, it may be advantageous to adjust the camera 16—specifically, the camera lens 16$_L$— in order to accommodate the change in field of view and depth of focus (i.e., in going from the main field of view 15 without the protective cover 20, to the reduced field of view 19 with the cover 20). This adjustment may be performed during the camera build process.

According to another embodiment, an illuminated macro lens cover 20 for a vehicle-mountable camera 16 includes: a housing 22 made of a polymer material 24 and configured for attachment to one of the camera 16 and a support structure 14 which supports the camera 16; a meniscus-shaped macro lens 30, 38 attached to the housing 22 and configured for alignment with an imaging axis 17 of the camera 16; a light source 40 attached to the housing 22 and configured for providing light 44 to a field of view 19 of the camera 16; a lightguide 70 attached to or incorporated into at least one of the housing 22 and the light source 40 and configured for conveying light 44 from the light source 40 to the field of view 19 of the camera 16 from one or more exit points 46 located at or outside of an outer periphery 34 of the lens 30; and an electrical connector 50 carried by the housing 22 and configured for receiving power 52 and/or signal commands 54 and for conveying the power 52 and/or signal commands 54 to the light source 40.

The illuminated macro lens cover 20 may further include one or more light isolating features 80 attached to or incorporated into at least one of the housing 22, the lens 30 and the lightguide 70 and configured to minimize or prevent the light 44 from the light source 40 from being directed or reflected into an imaging path 18 of the camera 16. The signal commands 54 may include one or more of an ON command 55, an OFF command 56, a light source selection command or identifier 57, and a lighting sequence command 58. The light source 40 may include one or more light-emitting diodes 42, the lens 30 may be coated with a hydrophobic coating 39, and the housing 22 may include one or more of a snap-on feature 26, a mounting boss 27, a mounting hole 28 and a captive fastener 29.

According to yet another embodiment, a vehicle camera system 10 includes a vehicle body structure 14, a camera 16 attached to the vehicle body structure 14, and a protective cover 20 for the camera 16. The protective cover 20 includes a housing 22 configured for attachment to one of the camera 16 and the vehicle body structure 14, a lens 30 (e.g., a macro lens 38 having a meniscus-like shape 36) attached to the housing 22 and configured for alignment with an imaging axis 17 of the camera 16, a light source 40 (e.g., one or more LEDs 42) attached to the housing 22 and configured for providing light 44 to a field of view 19 of the camera 16, and an electrical connector 50 carried by the housing 22 and configured for receiving power 52 and/or signal commands 54 and for conveying the power 52 and/or signal commands 54 to the light source 40.

The vehicle body structure 14 may be a wheel well 14$ww$, an underbody structure 14$_{UBS}$, a rear body structure 14$_{RBS}$ or a front body structure 14$_{FBS}$. The vehicle camera system 10 may further include a lightguide 70 attached to or incorporated into at least one of the housing 22 and the light source 40 and configured for conveying light 44 from the light source 40 to the field of view 19 of the camera 16. The vehicle camera system 10 may also further include one or more light isolating features 80 attached to or incorporated into at least one of the housing 22, the lens 30 and the lightguide 70 and configured to minimize or prevent the light 44 from the light source 40 from being directed or reflected into an imaging path 18 of the camera 16.

The above description is intended to be illustrative, and not restrictive. While the dimensions and types of materials described herein are intended to be illustrative, they are by no means limiting and are exemplary embodiments. In the following claims, use of the terms "first", "second", "top", "bottom", etc. are used merely as labels, and are not intended to impose numerical or positional requirements on their objects. As used herein, an element or step recited in the singular and preceded by the word "a" or "an" should be understood as not excluding plural of such elements or steps, unless such exclusion is explicitly stated. Additionally, the phrase "at least one of A and B" and the phrase "A and/or B" should each be understood to mean "only A, only B, or both A and B". Moreover, unless explicitly stated to the contrary, embodiments "comprising" or "having" an element or a plurality of elements having a particular property may include additional such elements not having that property. And when broadly descriptive adverbs such as "substantially" and "generally" are used herein to modify an adjective, these adverbs mean "for the most part", "to a significant extent" and/or "to a large degree", and do not necessarily mean "perfectly", "completely", "strictly" or "entirely". Additionally, the word "proximate" may be used herein to describe the location of an object or portion thereof with respect to another object or portion thereof, and/or to describe the positional relationship of two objects or their respective portions thereof with respect to each other, and may mean "near", "adjacent", "close to", "close by", "at" or the like.

This written description uses examples, including the best mode, to enable those skilled in the art to make and use devices, systems and compositions of matter, and to perform methods, according to this disclosure. It is the following claims, including equivalents, which define the scope of the present disclosure.

What is claimed is:

1. A protective cover for a camera, comprising:
a housing configured for attachment to one of the camera and a support structure which supports the camera;
a lens attached to the housing and configured for alignment with an imaging axis of the camera, thereby defining a first distance from the camera to the lens as measured along the imaging axis;
a light source attached to the housing and configured for providing light to a field of view of the camera;
a lightguide attached to or incorporated into one of the housing and the light source and configured for conveying light from the light source to the field of view of the camera, wherein the lightguide is configured to emit the light from the light source from one or more exit points located at or outside of an outer periphery of the lens and at least the first distance away from the camera as measured along the imaging axis;
one or more light isolating features attached to or incorporated into at least one of the housing, the lens and the lightguide and configured to minimize or prevent the light from the light source from being directed or reflected into an imaging path of the camera; and
an electrical connector carried by the housing and configured for receiving power and/or signal commands and for conveying the power and/or signal commands to the light source.

2. The protective cover of claim 1, wherein the signal commands include one or more of an ON command, an OFF command, a light source selection command or identifier, and a lighting sequence command.

3. The protective cover of claim 1, wherein the light source comprises one or more light-emitting diodes.

4. The protective cover of claim 1, wherein the housing is made of a polymer material.

5. The protective cover of claim 1, wherein the lens is coated with a hydrophobic coating.

6. The protective cover of claim 1, wherein the housing includes one or more of a snap-on feature, a mounting boss, a mounting hole and a captive fastener.

7. The protective cover of claim 1, wherein the lens is a meniscus-shaped macro lens.

8. An illuminated macro lens cover for a vehicle-mountable camera, comprising:
a housing made of a polymer material and configured for attachment to one of the camera and a support structure which supports the camera;
a meniscus-shaped macro lens attached to the housing and configured for alignment with an imaging axis of the camera, thereby defining a first distance from the camera to the macro lens as measured along the imaging axis;
a light source attached to the housing and configured for providing light to a field of view of the camera;
a lightguide attached to or incorporated into at least one of the housing and the light source and configured for conveying light from the light source to the field of view of the camera from one or more exit points located at or outside of an outer periphery of the lens and at least the first distance away from the camera as measured along the imaging axis;
one or more light isolating features attached to or incorporated into at least one of the housing, the lens and the lightguide and configured to minimize or prevent the light from the light source from being directed or reflected into an imaging path of the camera; and
an electrical connector carried by the housing and configured for receiving power and/or signal commands and for conveying the power and/or signal commands to the light source.

9. The illuminated macro lens cover of claim 8, wherein the signal commands include one or more of an ON command, an OFF command, a light source selection command or identifier, and a lighting sequence command.

10. The illuminated macro lens cover of claim 8, wherein the light source comprises one or more light-emitting diodes.

11. The illuminated macro lens cover of claim 8, wherein the lens is coated with a hydrophobic coating.

12. The illuminated macro lens cover of claim 8, wherein the housing includes one or more of a snap-on feature, a mounting boss, a mounting hole and a captive fastener.

13. A vehicle camera system, comprising:
a vehicle body structure;
a camera attached to the vehicle body structure; and
a protective cover for the camera, wherein the protective cover includes:
a housing configured for attachment to one of the camera and the vehicle body structure;
a lens attached to the housing and configured for alignment with an imaging axis of the camera, thereby defining a first distance from the camera to the lens as measured along the imaging axis;
a light source attached to the housing and configured for providing light to a field of view of the camera;
a lightguide attached to or incorporated into one of the housing and the light source and configured for conveying light from the light source to the field of view of the camera, wherein the lightguide is configured to emit the light from the light source from one or more exit points located at or outside of an outer periphery of the lens and at least the first distance away from the camera as measured along the imaging axis;

one or more light isolating features attached to or incorporated into at least one of the housing, the lens and the lightguide and configured to minimize or prevent the light from the light source from being directed or reflected into an imaging path of the camera; and an electrical connector carried by the housing and configured for receiving power and/or signal commands and for conveying the power and/or signal commands to the light source.

14. The vehicle camera system of claim 13, wherein the vehicle body structure is one of a wheel well, an underbody structure, a rear body structure and a front body structure.

* * * * *